(12) United States Patent
Yamashita et al.

(10) Patent No.: US 9,188,066 B2
(45) Date of Patent: Nov. 17, 2015

(54) SPEED REDUCTION METHOD FOR HAND-CARRIED ENGINE-DRIVEN WORKING MACHINE

(71) Applicants: IIDA DENKI KOGYO CO., LTD., Mitaka-shi, Tokyo (JP); ZAMA JAPAN CO., LTD., Hachimantai-shi, Iwate (JP)

(72) Inventors: Ryouhei Yamashita, Tokyo (JP); Akira Yamazaki, Tokyo (JP); Tamotsu Saitou, Hachimantai (JP); Hideki Watanabe, Hachimantai (JP); Takumi Nonaka, Hachimantai (JP)

(73) Assignees: IIDA DENKI KOGYO CO., LTD., Mitaka (JP); ZAMA JAPAN CO., LTD., Hachimantai (JP)

( * ) Notice: Subject to any disclaimer, the term of this patent is extended or adjusted under 35 U.S.C. 154(b) by 398 days.

(21) Appl. No.: 13/745,310

(22) Filed: Jan. 18, 2013

(65) Prior Publication Data

US 2013/0186368 A1    Jul. 25, 2013

(30) Foreign Application Priority Data

Jan. 25, 2012  (JP) .................................. 2012-013306

(51) Int. Cl.
| | |
|---|---|
| *F02D 3/04* | (2006.01) |
| *F02D 41/12* | (2006.01) |
| *F02P 5/15* | (2006.01) |
| *F02D 31/00* | (2006.01) |

(52) U.S. Cl.
CPC ................ *F02D 3/04* (2013.01); *F02D 31/003* (2013.01); *F02D 41/12* (2013.01); *F02P 5/1504* (2013.01); *F02D 2400/06* (2013.01); *Y02T 10/46* (2013.01)

(58) Field of Classification Search
CPC ......... F02D 1/00; F02D 3/04; F02D 2250/00; F02D 41/123; F02D 37/02; Y02T 10/46
USPC .......... 123/332–335, 401.11, 406.47, 406.56, 123/491–493; 701/105, 110
See application file for complete search history.

(56) References Cited

U.S. PATENT DOCUMENTS

| | | | | |
|---|---|---|---|---|
| 4,495,900 | A | * | 1/1985 | Stockmeyer .................. 123/1 A |
| 4,887,573 | A | * | 12/1989 | Fujiwara et al. ......... 123/406.51 |
| 5,047,943 | A | * | 9/1991 | Takahata et al. .............. 701/101 |
| 6,626,145 | B2 | * | 9/2003 | Enoyoshi et al. ........ 123/406.24 |
| 6,640,777 | B2 | * | 11/2003 | Enoyoshi et al. ........ 123/406.24 |
| 6,742,502 | B2 | * | 6/2004 | Nagatsu et al. .......... 123/406.24 |

(Continued)

FOREIGN PATENT DOCUMENTS

JP      A-2011-12685      1/2011

*Primary Examiner* — John Kwon
*Assistant Examiner* — Johnny H Hoang
(74) *Attorney, Agent, or Firm* — Oliff PLC

(57) ABSTRACT

A speed reduction method for a hand-carried engine-driven working machine is provided in which a speed reduction of an engine can be attained reliably and safely by preventing the occurrence of lean come-down phenomenon in such a state that the engine is operating in a practical revolution speed range. An acceleration is calculated based on a change in revolution speed, and when the acceleration becomes smaller than a predetermined threshold, an ignition timing is retarded by a desired amount based on a determination that the engine is being decelerated, and further, a fuel flow rate is also increased, whereby the decelerated state of the engine is maintained without fail, so that the occurrence of lean come-down phenomenon is prevented in the process of reducing the revolution speed of the engine.

2 Claims, 5 Drawing Sheets

(56) References Cited

U.S. PATENT DOCUMENTS

| | | | |
|---|---|---|---|
| 7,198,028 B2 * | 4/2007 | Andersson et al. | 123/339.11 |
| 7,735,471 B2 * | 6/2010 | Andersson et al. | 123/406.54 |
| 7,974,767 B2 * | 7/2011 | Maier et al. | 701/110 |
| 8,807,119 B2 * | 8/2014 | Andersson et al. | 123/406.11 |
| 2011/0023825 A1 * | 2/2011 | Lei et al. | 123/406.19 |

* cited by examiner

SPEED REDUCTION METHOD FOR HAND-CARRIED ENGINE-DRIVEN WORKING MACHINE

CROSS-REFERENCE TO RELATED APPLICATIONS

This application is based upon and claims the benefit of priority from the prior Japanese Patent Application No. 2012-13306 filed on Jan. 25, 2012, the entire contents of which are incorporated herein by reference.

BACKGROUND OF THE INVENTION

1. Field of the Invention

The present invention relates to a speed reduction method for a hand-carried engine-driven working machine such as a lawnmower or a chainsaw.

2. Description of the Related Art

Most of engines mounted on hand-carried engine-driven working machines which are currently marketed are expected to use gasoline as a fuel. However, from the viewpoint of reducing the load to the environment, a biofuel which is a mixture of gasoline and bioethanol has started to be propagated, and there are now demands for engines which can deal with such a biofuel.

When a biofuel is used for a gasoline engine, the fuel becomes lean due to the difference in theoretical air-fuel ratio between gasoline and bioethanol. This causes a tendency that the idle speed of the engine is increased or that the speed reduction control on the engine is deteriorated. In particular, in a practical revolution speed range in which a throttle valve of a carburetor is fully opened to increase the revolution speed of the engine to a working revolution speed range, there occurs a so-called lean come-down phenomenon which is a phenomenon in which when the engine is decelerated from a high-speed operating state, the engine has difficulty in reducing its revolution speed down to a clutch-in revolution speed or lower, for example, down to an idle speed range. Once this phenomenon occurs, a working portion such as a rotating blade of the hand-carried engine-driven working machine becomes reluctant to stop, resulting in a dangerous condition.

In addition to the case where the biofuel is used, this lean come-down phenomenon also occurs due to a change in density of air which is triggered by, for example, temperature, atmospheric pressure or elevation, a reduction in internal resistance of the engine associated with aged deterioration, or an increase in amount of air which is triggered by a reduction in airtightness or wear of carburetor parts.

In the lean come-down phenomenon, the phenomenon in which the idle speed of the engine is increased can be dealt with by making use of an approach disclosed in Patent Literature 1 (JP2011-012685), for example. The approach as prior art is such that a revolution speed in an idle revolution speed range is stabilized to a predetermined target revolution speed by controlling an ignition timing (retarding the ignition timing).

In the above-mentioned approach as prior art, however, the acceleration performance of an increasing or decreasing process of the revolution speed of the engine is largely affected, that is, the acceleration in such a change is made difficult to occur. Therefore, the applicable control range is limited to a low revolution speed range including the idle revolution speed range, which is lower than the clutch-in revolution speed which is the lowest revolution speed in the practical revolution speed range of hand-carried engine-driven working machines, leading to a problem that the approach as prior art has difficulty in application to middle to high revolution speed ranges of the practical revolution speed range including the working revolution speed range.

SUMMARY OF THE INVENTION

Then, the invention has been devised with a view to solving the problem inherent in the prior art described above. Specifically, the invention has been made to solve a technical problem of how to prevent the occurrence of a lean come-down phenomenon in such a state that an engine is running in a practical revolution speed range. Hence, an object of the invention is to attain a safe reduction in revolution speed of the engine of the working machine.

According to a first aspect of the invention, there is provided, as a main configuration, a speed reduction method for a hand-carried engine-driven working machine configured as a combination of gasoline engine and carburetor adapted to be mounted thereon, the carburetor provided with an electromagnetic valve for controlling a flow rate of fuel, including steps of:

calculating a revolution speed by a microcomputer provided in an ignition unit of the engine;

calculating an acceleration from a change in the revolution speed so calculated; and retarding an ignition timing based on a determination that the engine is being decelerated when the acceleration so calculated is smaller than a predetermined threshold.

In this engine revolution speed reduction control, it is determined that the engine is decelerated, based on the fact that the acceleration obtained from the revolution speed calculated becomes smaller than the predetermined threshold. And therefore, it is possible to accurately determine that the revolution of the engine is being decelerated.

In this way, the ignition timing of the engine is retarded in such a state that the revolution of the engine is really being decelerated, and therefore, the revolution speed of the engine is reduced reliably and safely, thereby making it possible to prevent the occurrence of a lean come-down phenomenon without fail. In addition, the retardation of the ignition timing of the engine is implemented only during the deceleration of the engine, and therefore, there would not happen such a situation that the retardation of the ignition timing badly affects the acceleration of the engine.

According to a second aspect of the invention, there is provided a speed reduction method for a hand-carried engine-driven working machine as set forth in the first aspect of the invention, wherein a fuel flow rate is increased when it is determined that the engine is being decelerated.

With the speed reduction method for a hand-carried engine-driven working machine according to the second aspect of the invention which additionally includes the step of increasing the fuel flow rate when it is determined that the engine is being decelerated, it is possible to attain the speed reduction of the engine more reliably and safely by increasing the flow rate of fuel supplied to the engine.

According to a third aspect of the invention, there is provided a speed reduction method for a hand-carried engine-driven working machine as set forth in the first or second aspect of the invention, wherein a revolution speed range which is detected in order to determine that the engine is being decelerated is set to a revolution speed range which is equal to or higher than a clutch-in revolution speed.

With the speed reduction method for a hand-carried engine-driven working machine according to the third aspect of the invention wherein the revolution speed range which is detected in order to determine that the engine is being decelerated is set to the revolution speed range which is equal to or higher than the clutch-in revolution speed, a speed reduction in a practical revolution speed range which is equal to or faster than the clutch-in revolution speed can be attained reliably and safely. Therefore, it is possible to prevent the occurrence of a lean come-down phenomenon in the practical revolution speed range without fail.

According to a fourth aspect of the invention, there is provided a speed reduction control method for a hand-carried engine-driven working machine as set forth in any of the first to third aspects of the invention, wherein the speed reduction control is ended when the revolution speed of the engine is reduced down to the clutch-in revolution speed or lower.

With the speed reduction method for a hand-carried engine-driven working machine according to the fourth aspect of the invention wherein the speed reduction control is ended when the revolution speed of the engine is reduced down to the clutch-in revolution speed or lower, it is possible to prevent the unstable operation of the engine resulting from excessive control.

As described heretofore, the following advantages are provided according to the aspects of the invention.

With the speed reduction method for a hand-carried engine-driven working machine according to the first aspect of the invention, the revolution speed of the engine is reduced reliably and safely, whereby the occurrence of a lean come-down phenomenon can be prevented, thereby making it possible to attain the safe operation of the engine without fail. In addition, the retarding process of the ignition timing does not affect badly the acceleration of the engine, and therefore, it is possible to attain the proper and smooth acceleration control operation of the engine.

With the speed reduction method for a hand-carried engine-driven working machine according to the second aspect of the invention wherein the fuel flow rate is increased when it is determined that the engine is being decelerated, the speed reduction of the engine can be attained more reliably and safely, whereby it is possible to attain the safe operation of the engine without fail.

With the speed reduction method for a hand-carried engine-driven working machine according to the third aspect of the invention wherein the revolution speed range which is detected in order to determine that the engine is being decelerated is set to the revolution speed range which is equal to or higher than the clutch-in revolution speed, it is possible to prevent the occurrence of a lean come-down phenomenon in the practical revolution speed range without fail, whereby it is possible to reduce the revolution speed of the engine down to the clutch-in revolution speed or lower quickly.

With the speed reduction method for a hand-carried engine-driven working machine according to the fourth aspect of the invention wherein the speed reduction control is ended when the revolution speed of the engine is reduced down to the clutch-in revolution speed or lower, it is possible to prevent the unstable operation of the engine resulting from excessive control. Therefore, it is possible to end the speed reduction control more reliably and safely.

DETAILED DESCRIPTION OF THE INVENTION

Hereinafter, an embodiment of the invention will be described by reference to the drawings. And it is noted that the wording of "speed" and "acceleration" as used in the specification means revolution speed and revolution acceleration, respectively.

Figure 1:
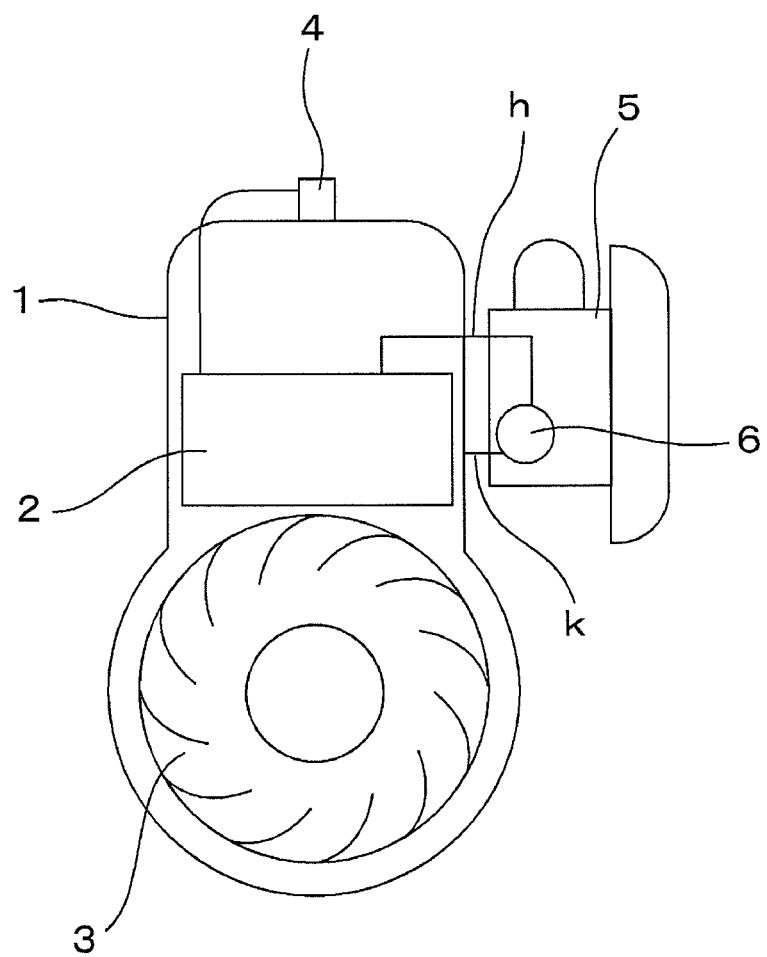
FIG. 1 is a schematic explanatory diagram of an engine to which the invention is applied.

In FIG. 1, in an engine 1, in addition to ignition of a spark plug 4 and control of a microcomputer in an ignition unit 2, a permanent magnet incorporated in a flywheel 3 and a power generating coil (whose illustration is omitted) in the ignition unit 2 generate electric power for driving an electromagnetic valve 6. Additionally, the microcomputer in the ignition unit 2 detects a time per revolution of the engine 1 while it is revolving and stores revolution speed data therein.

The electromagnetic valve 6 is provided in the carburetor 5, and this electromagnetic valve 6 increases or decreases fuel (for example, a biofuel which is a mixture of gasoline and bioethanol) in accordance with a drive signal h from the ignition unit 2. An air-fuel mixture k which is a mixture of air and fuel produced in the carburetor 5 is supplied into an interior of a cylinder of the engine 1.

Figure 2:
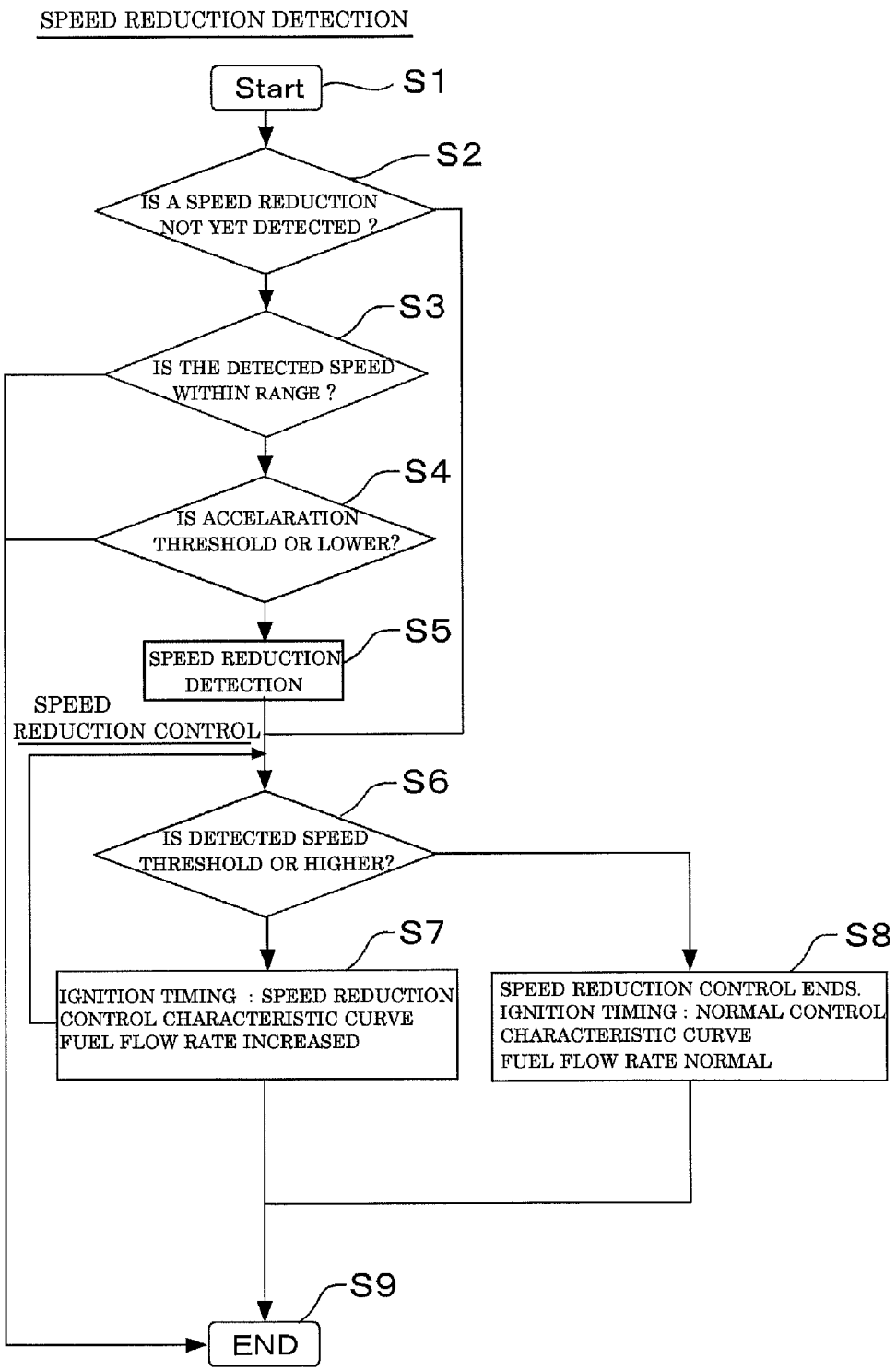
FIG. 2 is a flowchart depicting a control algorithm of an embodiment of the invention.

FIG. 2 depicts a control algorithm per revolution performed by the microcomputer in the ignition unit 2. In a practical revolution speed range in which a throttle valve of the carburetor 5 is substantially fully opened, a speed reduction control starts with verification of the operation of the engine 1 in step S1, thereafter proceeds step by step from step S2 to step S9 through step S3, step S4, step S5, step S6 and step S7 and ends. If YES in step S2, step S6 is performed by bypassing step S3, step S4 and step S5. In addition, if NO in step S3 and step S4, the speed reduction control jumps to step S9 and the controlling operation stops there. Further, if NO in step S6, the speed reduction control proceeds to step S9 by way of step S8.

Namely, the microcomputer, which has detected the time per revolution of the engine 1 and stored the revolution speed data, determines whether or not the engine 1 is being decelerated by comparing the latest revolution speed data with the one previous revolution speed data every time the engine 1 revolves and determines a revolution speed range at that time as well. When an acceleration calculated by comparing the revolution speeds detected every time the engine 1 revolves with each other is equal to or smaller than a threshold, the microcomputer determines that the engine 1 is being decelerated. Following this, when the revolution speed of the engine 1 is equal to or larger than a predetermined value, for example, equal to or larger than a clutch-in revolution speed, the microcomputer executes a speed reduction control.

Figure 3:
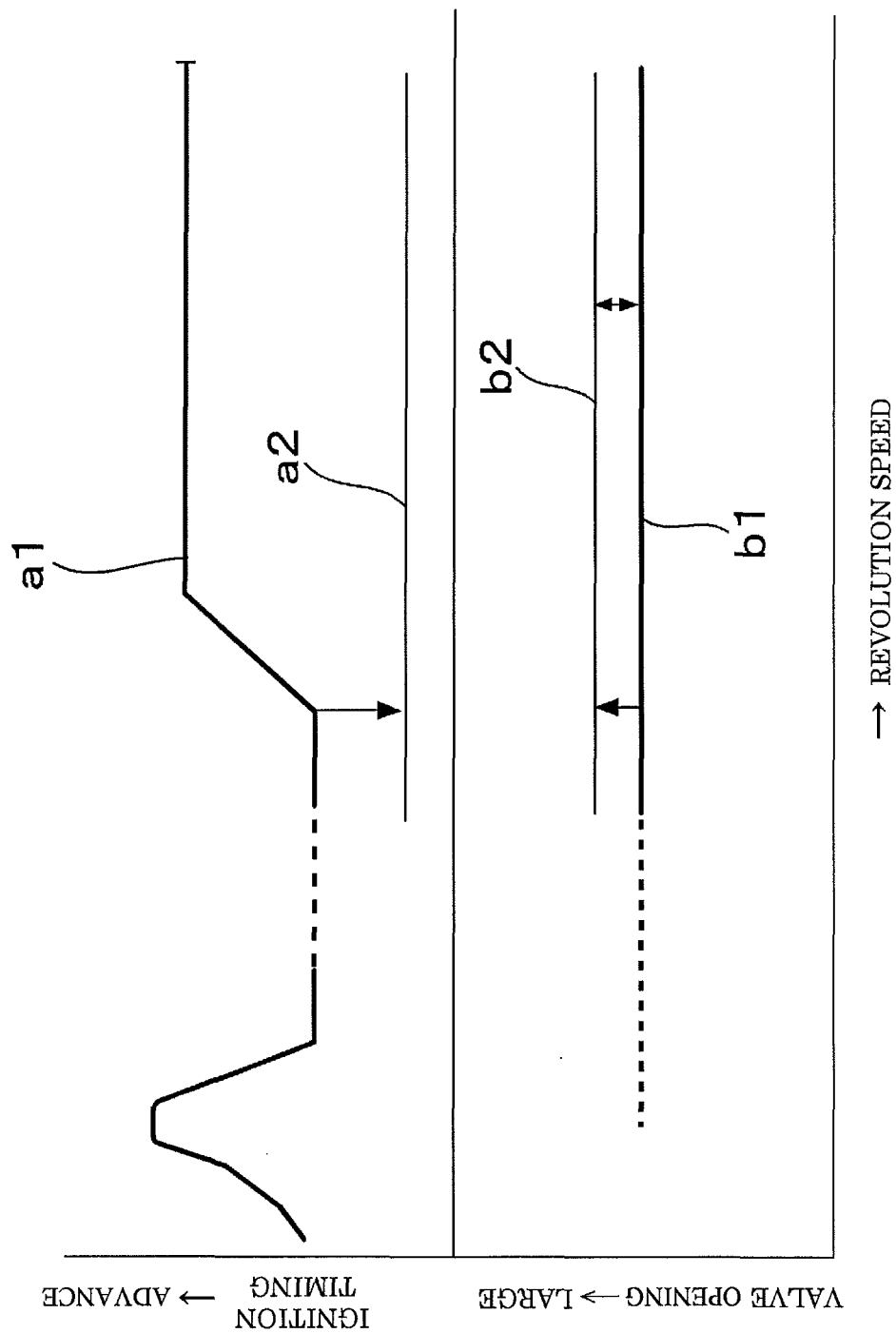
FIG. 3 is a graph diagram depicting an example of a speed reduction control process.

FIG. 3 is a graph diagram depicting an example of a speed reduction control operation and depicts two operating states. One operating state is an operating state in which, among an ignition timing on an ignition timing characteristic curve a1 resulting before the speed reduction control of the invention is performed, an ignition timing corresponding to a revolution speed range which is equal to or larger than the clutch-in revolution speed is retarded to an ignition timing characteristic curve a2 in accordance with the invention. The other operating state is an operating state in which a valve opening characteristic curve b1 which results before the speed reduction control of the invention is performed is increased to a valve opening characteristic curve b2 in accordance with the invention. Namely, FIG. 3 depicts the case where both approaches are performed as the speed reduction method of the invention in which the ignition timing is retarded and the valve opening is increased to increase, in turn, the flow rate of fuel.

Figure 4:
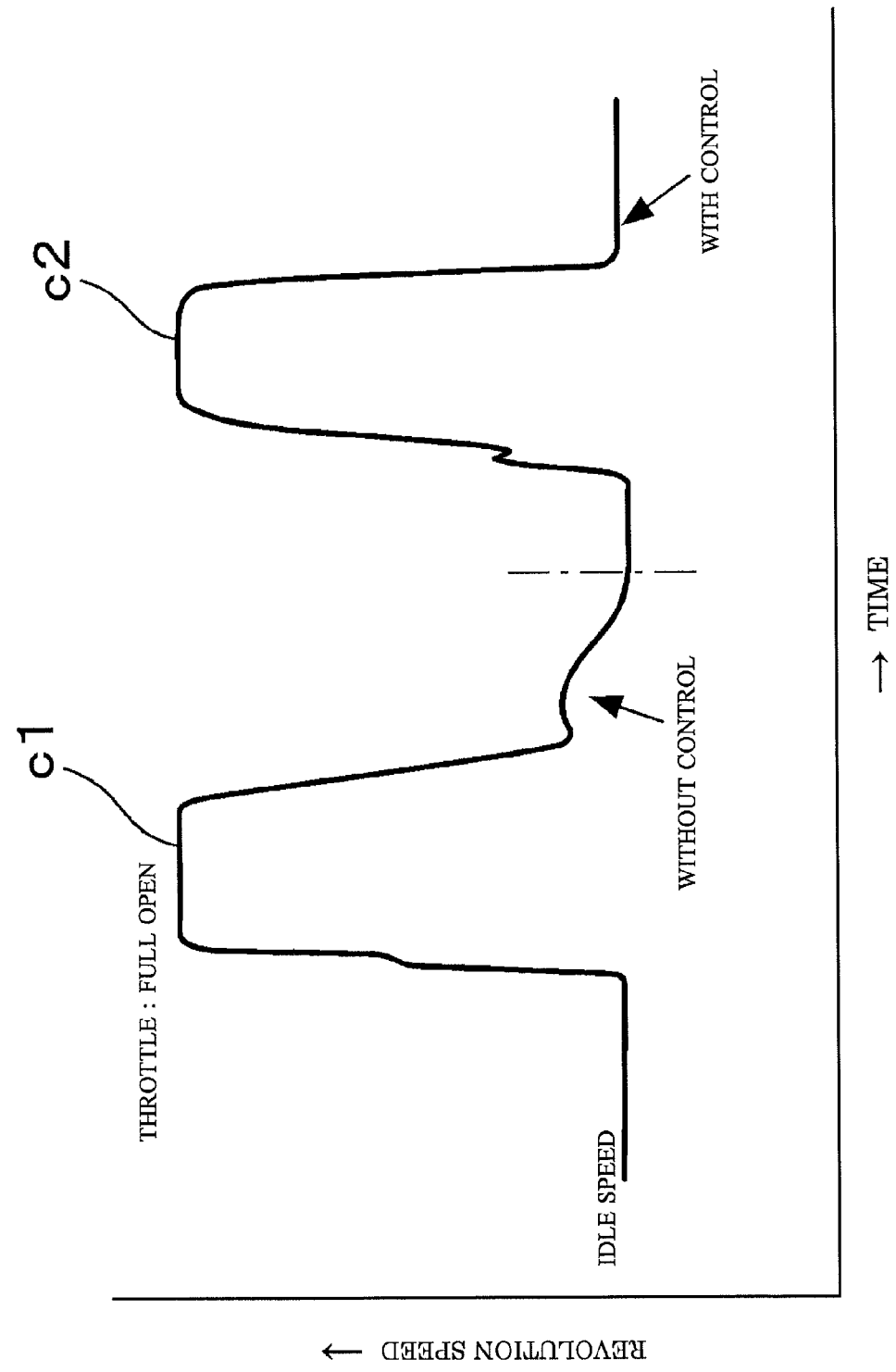
FIG. 4 is a graph diagram depicting the presence of a lean come-down phenomenon by comparison.

FIG. 4 is a graph diagram which depicts a graph portion which indicates an existence or nonexistence of lean come-down phenomenon. A revolution speed characteristic curve c1 which results when the speed reduction control of the invention is not performed is depicted on a left-hand side of an alternate long and short dash line, and on a right-hand side of the alternate long and short dash line a revolution speed characteristic curve c2 which results after the speed reduction control of the invention is performed is depicted. The revolution speed characteristic curve c1 indicates a state in which when the revolution speed of the engine 1 is reduced from the practical revolution speed range in which the throttle valve is fully opened down to an idle speed, a "lean come-down phenomenon" is occurring at a portion indicated by an arrow with a caption reading "without control" and hence, it is clearly shown that the revolution speed is reluctant to be reduced. On the other hand, the revolution speed characteristic curve c2 which results after the speed reduction control of the invention is performed indicates a state in which no "lean come-down phenomenon" is occurring and hence, it is clearly shown that the revolution speed is reduced from the practical revolution speed range down to the idle revolution speed range in an extremely smooth fashion.

Figure 5:
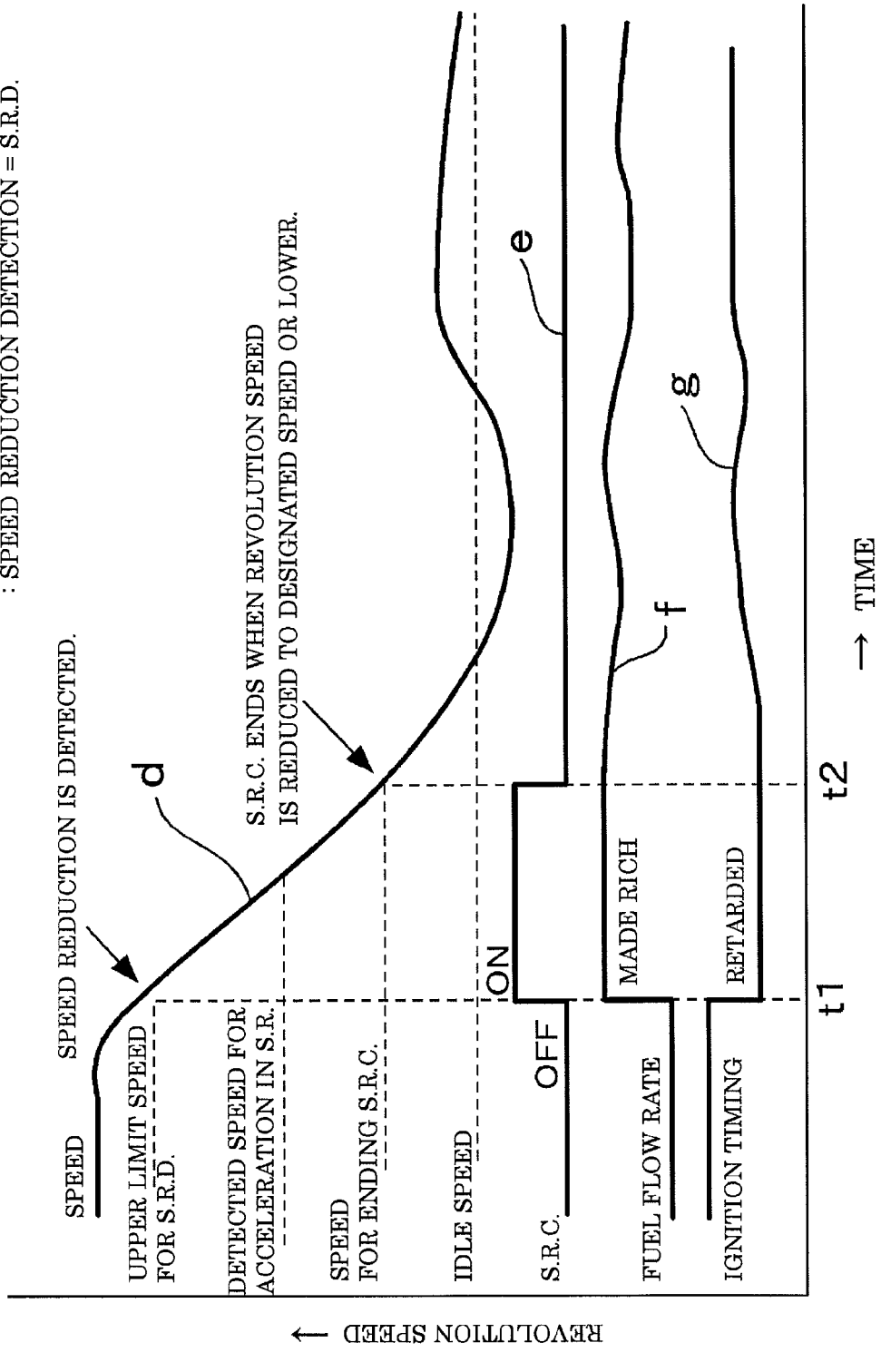
FIG. 5 is a graph diagram depicting an example of an operating state of the invention.

FIG. 5 depicts an example of an operating state of the invention, in which as indicated by a revolution speed change characteristic curve d, when a deceleration of the engine 1 is detected in step S2 at a point t1 in time at which the revolution speed of the engine 1 reaches an upper limit speed of a speed reduction detection which is specified within the practical revolution speed range, the speed reduction control of the invention is started by the microcomputer in the ignition unit 2 as indicated by a speed reduction control characteristic curve e. It is judged in step S6 whether or not the revolution speed of the engine 1 is so high that the speed reduction control needs to be performed. Then, as indicated by an ignition timing change curve g, the ignition timing is retarded by a value set, and the electromagnetic valve 6 is controlled in accordance with a drive signal h from the microcomputer so that as indicated by a fuel flow rate characteristic curve f, the flow rate of fuel is increased by a certain amount to produce a rich air-fuel mixture, and the engine 1 is kept in the decelerated state. The speed reduction control of the invention is continued until it is verified in step S6 that the revolution speed of the engine 1 is reduced down to a predetermined level, for example, a speed reduction control ending speed which is the clutch-in revolution speed.

Then, when it is detected in step S6 that the revolution speed of the engine 1 has been reduced down to the speed reduction control ending speed at a point t2 in time, the speed reduction control ends (refer to the speed reduction control characteristic curve e). When the speed reduction control of the invention ends, although the ignition timing and the fuel flow rate are restored to those original states before the speed reduction control in accordance with the step S8, the restoration of the ignition timing and the fuel flow rate to those before the speed reduction control is implemented step by step as indicated by the ignition timing change curve g and the fuel flow rate characteristic curve f.

On the other hand, the revolution speed of the engine 1 after the speed reduction control has ended is reduced quickly and stably down to the target idle revolution speed range without generating any lean come-down phenomenon as indicated by the revolution speed change characteristic curve d and stays within the idle revolution speed range.

Thus, as described heretofore, according to the speed reduction control method for a hand-carried engine-driven working machine of the invention, not only the ignition timing but also the fuel flow rate is controlled as the acceleration in revolution of the engine is reduced. Therefore, there are no fears at all that the acceleration is affected badly within the practical revolution speed range of the engine, and the occurrence of lean come-down phenomenon can be prevented without fail while the engine is allowed to operate properly and stably in the practical revolution speed range. Thus, the speed reduction control of the invention is expected to be used and deployed widely in the field of hand-carried engine-driven working machines where smooth and safe operations are strongly demanded.

What is claimed is:

1. A speed reduction method for a hand-carried engine-driven working machine configured as a combination of a gasoline engine and a carburetor adapted to be mounted thereon, the carburetor provided with an electromagnetic valve for controlling a flow rate of fuel, the method comprising steps of:

calculating a revolution speed of the engine by a microcomputer provided in an ignition unit of the engine;

calculating an acceleration from a change in the calculated revolution speed; and retarding an ignition timing based on a determination that the engine is being decelerated when the calculated acceleration is smaller than a predetermined threshold, wherein a revolution speed range, which is detected in order to determine that the engine is being decelerated, is set to a revolution speed range that is equal to or greater than a clutch-in revolution speed, and seed reduction control is ended when the revolution speed of the engine is reduced down to the clutch-in revolution speed or lower.

2. The speed reduction method for a hand-carried engine-driven working machine according to claim 1, wherein a fuel flow rate is increased when it is determined that the engine is being decelerated.

* * * * *